US012231378B2

(12) United States Patent
Swaminathan et al.

(10) Patent No.: US 12,231,378 B2
(45) Date of Patent: Feb. 18, 2025

(54) REALTIME CONVERSATION AI INSIGHTS AND DEPLOYMENT

(71) Applicant: SAP SE, Walldorf (DE)

(72) Inventors: Sairam Swaminathan, Bangalore (IN); Amrendra Kumar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/331,521

(22) Filed: Jun. 8, 2023

(65) Prior Publication Data
US 2024/0414106 A1 Dec. 12, 2024

(51) Int. Cl.
H04L 51/02 (2022.01)
G06F 8/658 (2018.01)
G06F 40/40 (2020.01)

(52) U.S. Cl.
CPC ............ H04L 51/02 (2013.01); G06F 8/658 (2018.02); G06F 40/40 (2020.01)

(58) Field of Classification Search
None
See application file for complete search history.

(56) References Cited

U.S. PATENT DOCUMENTS

2017/0250930 A1* 8/2017 Ben-Itzhak ............ G06F 3/0488
2020/0342032 A1* 10/2020 Subramaniam ....... G06F 11/322
2021/0035113 A1* 2/2021 Kuchoor ................. H04L 51/02
2021/0144107 A1* 5/2021 Liang ..................... G06N 5/04
2021/0243141 A1* 8/2021 Parekh .................. H04L 51/212
2021/0304003 A1* 9/2021 Johnson ................ G06F 18/217
2021/0304075 A1* 9/2021 Duong .................. G10L 15/197
2021/0304733 A1* 9/2021 Jalaluddin ............ G06F 40/284
2021/0319360 A1* 10/2021 Vishnoi ................. G06N 5/043
2021/0390951 A1* 12/2021 Gadde ..................... G06F 40/30
2022/0100961 A1* 3/2022 Vishnoi ................ G06F 40/211
2022/0116341 A1* 4/2022 Smullen ................. H04L 51/04

* cited by examiner

Primary Examiner — Phyllis A Book
(74) Attorney, Agent, or Firm — Fountainhead Law Group, PC

(57) ABSTRACT

A first version of a chatbot using natural language processing conducts conversations with a plurality of users. The chatbot provides responses by triggering a plurality of skills including a fallback skill that is triggered when no other skill corresponds to the intent of the user. A second version of the chatbot is deployed while the first version of the chatbot is concurrently engaged in a set of conversation sessions. The second version of the chatbot is configured to trigger other skills besides the fallback skill for at least a portion of the conversations in which the first version of the chatbot triggered the fallback skill. New conversation sessions are mapped to the second version of the chatbot while the set of conversation sessions the first version of the chatbot is engaged in are still mapped to the first version of the chatbot.

11 Claims, 5 Drawing Sheets

REALTIME CONVERSATION AI INSIGHTS AND DEPLOYMENT

BACKGROUND

The present disclosure pertains to artificial intelligence chat bots and in particular to real time conversation insights and chatbot deployment.

Certain software platforms and applications enable chatbots to be trained, built, tested, connected, and monitored. For example, developers may use a conversational AI application to build bots and then deploy them to a tenant system. Once deployed, end users can chat with the newly created bot. When the end users chat with the bot, there are multiple ways that the conversation can end. For example, the conversation flow may be fully complete, or the conversation flow may end abruptly, such as when no "intent" or "skill" was identified and a "fallback" was triggered. The fallback may be used when the AI chatbot is not able to solve or respond to a query from the user, negatively affecting the user's experience and satisfaction. In certain chatbot platforms, a chatbot developer is not provided with options to figure out how the bot is performing in the production environment, instead receive feedback from the users themselves, via incidents\tickets. There is a need for improved techniques for gaining insights on chatbot conversations and in rectifying and improving the end user experience.

The present disclosure addresses these issue and others, as further described below.

DETAILED DESCRIPTION

Figure 1:
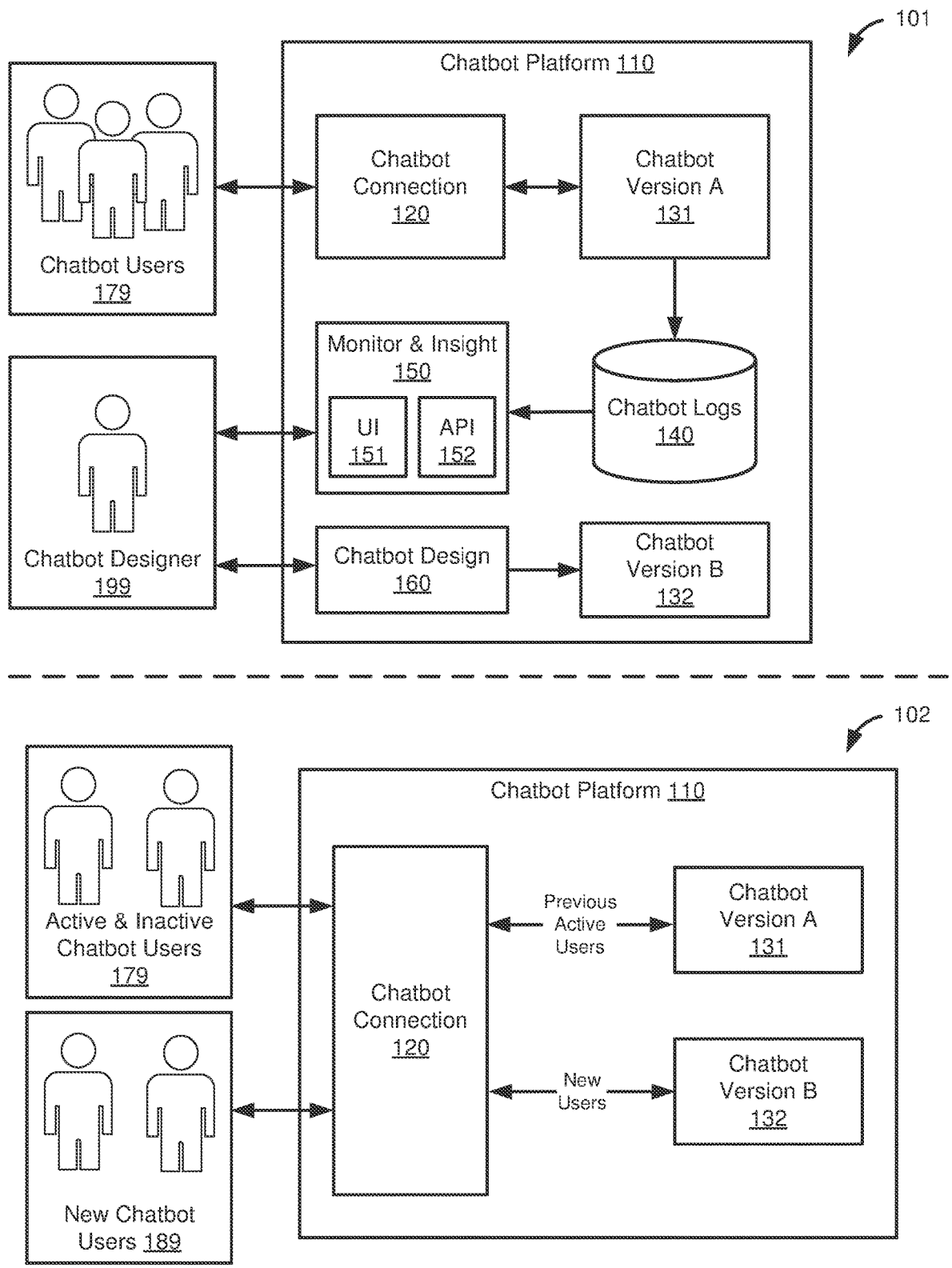
FIG. 1 shows a diagrams of a new version of a chatbot being designed and deployed in realtime, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first." "second," "third," "fourth," etc., do not necessarily indicate an ordering or sequence unless indicated. These terms, as used herein, may simply be used for differentiation between different objects or elements.

Prior to describing improved techniques for realtime conversation insights and chatbot deployment, certain relevant terms are described.

A "chatbot" is a computer program or an artificial intelligence (AI) that is designed to conduct conversations with human users, most frequently via virtual assistants, messaging applications, or individual organizations' applications and websites. Chatbots are sometimes used in customer service or information acquisition scenarios, for example.

A "conversational AI" application refers to a software application that provides a user interface to train, build, test, connect and monitor chatbots which use natural language processing (NLP) technology.

A "conversation" refers to a dialog between a user and a chatbot in which the chatbot executes one or more "intents" or "skills" to help the user achieve a goal or resolve an issue.

An "utterance" refers to a statement or request made by the user to the chatbot. A string of text including several words or sentences, typed by the user and submitted to the chatbot, for example. An utterance may be matched to a "skills" which triggers that skill to perform actions. For example, an utterance of "I want to create a purchase order" may match a "create purchase order" skill of a procurement bot. The user inputting "I want to create a purchase order" to the procurement bot may trigger the corresponding "create purchase order" skill, which initiations creation of a purchase order, presents a purchase order form or asks questions regarding the purchase order, etc.

The terms "intent" and "skill" may be used similarly in some cases. An "intent" generally refers to a collection of sentences that have the same meaning, but are formulated differently. For example, the sentences "are you a bot?" and "am I speaking to a real person?" When a user sends a message to the chatbot, an algorithm predicts or determines to which intents it matches and determines the intention of the message.

A "skill" generally refers to a block of conversation that has a clear purpose and that a chatbot can execute to achieve a goal. A skill may be the ability to greet someone, but it can also be more complex, like giving suggestions based on information provided by the user.

A "fallback" skill is a skill that is triggered when no other skill matches the intent of the user.

A "trigger" refers to conditions that determine whether the chatbot should execute the skill. If the triggers for the skill are validated, the bot executes this skill over other skills.

As mentioned above, the conversation flow between an end user and a chatbot may end abruptly in some situations, such as when no "intent" or "skill" was identified and a "fallback" skill was triggered. The fallback skill may be used when the AI chatbot is not able to solve or respond to a query from the user, negatively affecting the user's experience and satisfaction. In certain chatbot platforms, a chatbot developer is not provided with options to figure out how the chatbot is performed in the production environment with end users and instead receive feedback from the users themselves.

The present disclosure provides improved techniques for gaining insights on chatbot conversations and in rectifying and improving chatbot conversational intents and skills in realtime. These techniques are introduced with respect to FIG. 1.

FIG. 1 shows a diagrams 101 and 102 of a new version of a chatbot 132 being designed and deployed in realtime, according to an embodiment. Both the upper diagram 101 and the lower diagram 102 show a chatbot platform 110, which may be operated by one or more computer systems. In some embodiments the chatbot platform may be part of a cloud platform.

The upper diagram 101 shows a chatbot designer 199 designing chatbot version B 132 in realtime while chatbot users 179 are using Chatbot version A 131. The lower diagram 102 shows new chatbot users 189 using the new chatbot version B 132 as well as the original chatbot users 179, of which the users who are still active are using chatbot version A 131. Any previously active user that went inactive and becomes active again may be treated as a new conversation, for example. The chatbot platform 110 and the realtime deployment of new chatbot versions are described in further detail below.

The chatbot platform 110 provides "conversational AI" software applications, including a chatbot design application 160 that enable a chatbot designer 199 to train, build, test, connect and monitor chatbots which use natural language processing (NLP) technology. The chatbot design application 160 may train chatbots by analyzing text inputs using NLP technology. The chatbot design application 160 may build the chatbot to use "skills," and set up triggers, requirements, and chatbot responses. The chatbot platform 110 may also enable versioning of chatbots and deployment of chatbots to specific environments. For example, a designer may create a new version of the bot and test it in a staging environment before moving it to the production environment. In some embodiments the chatbot version A 131 was designed by the chatbot designer 199 using the chatbot design application 160.

The chatbot platform 110 is configured to operate chatbots in a production environment. The chatbot platform 110 operates the chatbot version A 131 and provides this chatbot to chatbot users 179. Once it is designed and deployed, the chatbot platform 110 also operates the chatbot version B 132.

The chatbot platform 110 also provides a chatbot connection component 120. The chatbot connection component 120 is configured to connect chatbots, such as the chatbot version A 131, to another software application, external communication channel, or back-end system used by chatbot users 179. The chatbot connection component 120 may be configured to map particular chatbot users of the users 179 to different versions of the chatbot during realtime deployment as further described below.

The chatbot platform 110 also stores chatbot logs 140. The chatbot logs may store conversation of the chatbot (e.g., in a database) as conversation logs. These logs may be provided to a monitor and insight component 150.

The chatbot platform 110 also provides the monitor and insight component 150. As used herein, the term "insight" refers to a designer or developer, such as the chatbot designer 199, gaining understand of how users talk to their chatbot and determining how to improve those user's experience. In some embodiments insights may be based on usage and training data including logs, usage metrics, and training analytics.

The monitor and insight component 150 includes a user interface (UI) 151 and an application programming interface (API) 152. The API 152 and the UI 151 are accessible by the chatbot designer 199. The chatbot designer 199 may access the stored chatbot logs 140 directly using the API 152 or they may review the logs using the user interface UI provided by the chatbot platform 110.

The chatbot designer 199 can use the monitor and insight component 150 to extract information and insights from the chatbot logs 140 to identify the conversations where a fallback skill had been triggered. The monitor and insight component 150 may provide the chatbot logs 140 to the chatbot designer 199 for each chatbot that they have designed and deployed to production. An example API request payload is given below:

```
{
"owner_slug": "string",
"from_date": "string",
"end_date": "string"
}
```

In the example API request payload, the "owner_slug" is a human readable unique identifier of the owner or designer of chatbots, such as an identifier the chatbot designer 199. The "from_date" and the "end_date" together provide a range of dates for conversations to be collected. The monitor and insight component 150 may be configured to identify specific chatbot conversations to obtain from the chatbot logs 140 based on unique conversation IDs stored in the chat logs.

An example response payload for two conversations is given below.

```
{
  "count": 2,
  "conversations": [
    {
      "id": "test-1675420607913",
      "language": "en",
      "timezone": "eastern standard time",
      "skill": "fallback",
      "skill_id": "dw69d3f7-69aa-41a0",
      "client_info": {
        "channel_type": "web_client"
      },
      "timestamp": "2023-01-03T10:36:52.419Z"
    }
    {
      "id": "test-23715420567913",
      "language": "en",
      "timezone": "eastern standard time",
      "skill": "fallback",
      "skill_id": "dw69d3f7-69aa-41a0",
      "client_info": {
        "channel_type": "web_client"
      },
      "timestamp": "2023-02-03T11:12:43.212Z"
    }
  ]
}
```

In the example response payload above, the "id" is the unique conversation ID. The "language" identifies the language that the conversation was conducted in (e.g., "en" for English). The "timezone" refers to the timezone of the "timestamp", which indicated the time that the conversation was logged. The "skill" in the response payload identifies the skill that was selected to be used by the chatbot in responding to the user in the conversation. In this example, both conversations used the "fallback" skill, which, as mentioned above, is used when the chatbot is not able to identify an appropriate skill to use. In the example response payload the "client info" portion identifies the "channel_type." In this example, both conversations were held via a web-based client (e.g., in a web browser).

After the chatbot designer 199 obtains the list of conversation IDs using the UI 151 or API 152 (e.g., from the response payload) of the monitor and insight component 150, they can filter using the corresponding conversation ID to analyze the conversations message by message. The chatbot designer 199 can filter to obtain the conversation logs that used the fallback skill. In some embodiments the monitor and insight component 150 may provide the chatbot designer 199 with hints or insights on how to rectify the break in the conversation flow that resulted in the fallback skill being triggered.

By analyzing the conversations, chatbot designer 199 can understand what needs to be done to prevent the fallback skill being triggered during the conversation flow. The chatbot designer 199 can then rectify the chatbot so that the user's conversational queries or statements are appropriately handled by a new skill or by a modification to an existing skill. Once the chatbot designer 199 has determined a solution to fix the conversation flow, they can create a new version of the chatbot and deploy the new version in realtime without affecting any ongoing conversations in production. For instance, new skills or modifications can be implemented in a new chatbot version B 132 that is a newer version of the chatbot version A 131, which is currently being used by chatbot users 179.

The chatbot platform 110 enables the chatbot designer 199 to create and deploy a new version of the chatbot to the production environment to be used by end users. Such deployment may involve the new chatbot version (e.g., chatbot version B 132) being created on the chatbot platform 199 backend, new conversations (e.g., from new users or from inactive users returning) from that point being directed to the newly created version. Furthermore, if there are any ongoing conversation with the previous version of the chatbot, such "active" conversations are still mapped to that previous version of the chatbot.

The chatbot platform 110 may also determine whether there are any active conversation for the outgoing (previous) version of the chatbot and when there are no active conversations with the outgoing version of the bot, that version is marked as inactive.

An example of this is shown in the lower diagram 102, which shows new chatbot users 189 using the new chatbot version B 132 as well as the original chatbot users 179, of which the users who are still active are using chatbot version A 131 while the inactive users are connected with the new chatbot version B 132 and will chat with that version if they become active. Once none of the original chatbot users 179 are in active conversations, the chatbot version A 131 is marked as inactive.

An example use case of the chatbot platform 110 by the chatbot designer 199 is now described.

To start the example, the chatbot designer 199 creates chatbot version A 131 using the chatbot design component 160. In this example the chatbot version A 131 is a procurement bot configured to respond to conversations about procurement for an organization. The procurement bot may include skills to create a purchase order, search for purchase orders, and list purchase orders for a particular user, for example.

The chatbot designer 199 deploys chatbot version A 131 to production such that is accessible by the chatbot users 179. The chatbot users 179 use chatbot version A 131 over a period (e.g., one month) and now the chatbot designer 199 wants to know how their procurement bot, chatbot version A 131, is performing in production. Chatbot designer 199 can use API 152 to get the list of conversation IDs which ended by triggering Fallback Skills. Using the monitor and insight component 150, the chatbot designer 199 can navigate the user interface 151 to view a "monitor" tab and select "Conversation Metrics", where he can search the conversation ID to see the entire conversation message by message. The chatbot designer 199 may select an "Identify Fallback skills triggered" button and view information on the corresponding conversations. From this, the chatbot designer 199 may determine that a particular conversation, such as a conversation with ConversationID: test-1675420607913, has completed by triggering fallback skill. In this example, the chatbot designer 199 analyses the conversation flow and creates a new skill that can be used to complete the transaction requested by the user in that past conversation.

In this example, the chatbot designer 199 then designs a new version of this chatbot, chatbot version B 132, and tests it by deploying to staging environment. The chatbot designer 199 may confirm that fallback skill is not triggered and they may deploy the newly created chatbot version B 132 of the procurement bot to production (e.g., within the chatbot platform 110). In this example, the chatbot connection component 120 may be configured such that all new conversations are automatically switched to the latest deployed chatbot version B 132 and chatbot version A 131 is undeployed once all active conversation sessions are inactive for chatbot version A 131.

Features and advantages of the techniques for realtime conversation insights and chatbot deployment described above include the ability to enable a chatbot designer to not only create a chatbot and deploy a version of that chatbot to production, but to also determine how well the chatbot performs in production by using the monitor and insight API and UI to filter for conversations that ended with the fallback skill and analyze these conversations to gain insights on why they ended with the fallback. The chatbot designers are also able to get insights on how to modify the chatbot to improve the users experiences. The chatbot designer is also able to deploy a newer version to production in realtime without affecting the existing conversations in production already using the older version.

Further details on the techniques for realtime conversation insights and chatbot deployment are described below. A method for realtime chatbot deployment is described below with respect to FIG. 2. A flowchart for deploying a new version of a chatbot and undeploying an older version is described with respect to FIG. 3. And a flowchart for handling dialog utterances during realtime deployment of a new version of a chatbot is described with respect to FIG. 4.

Figure 2:
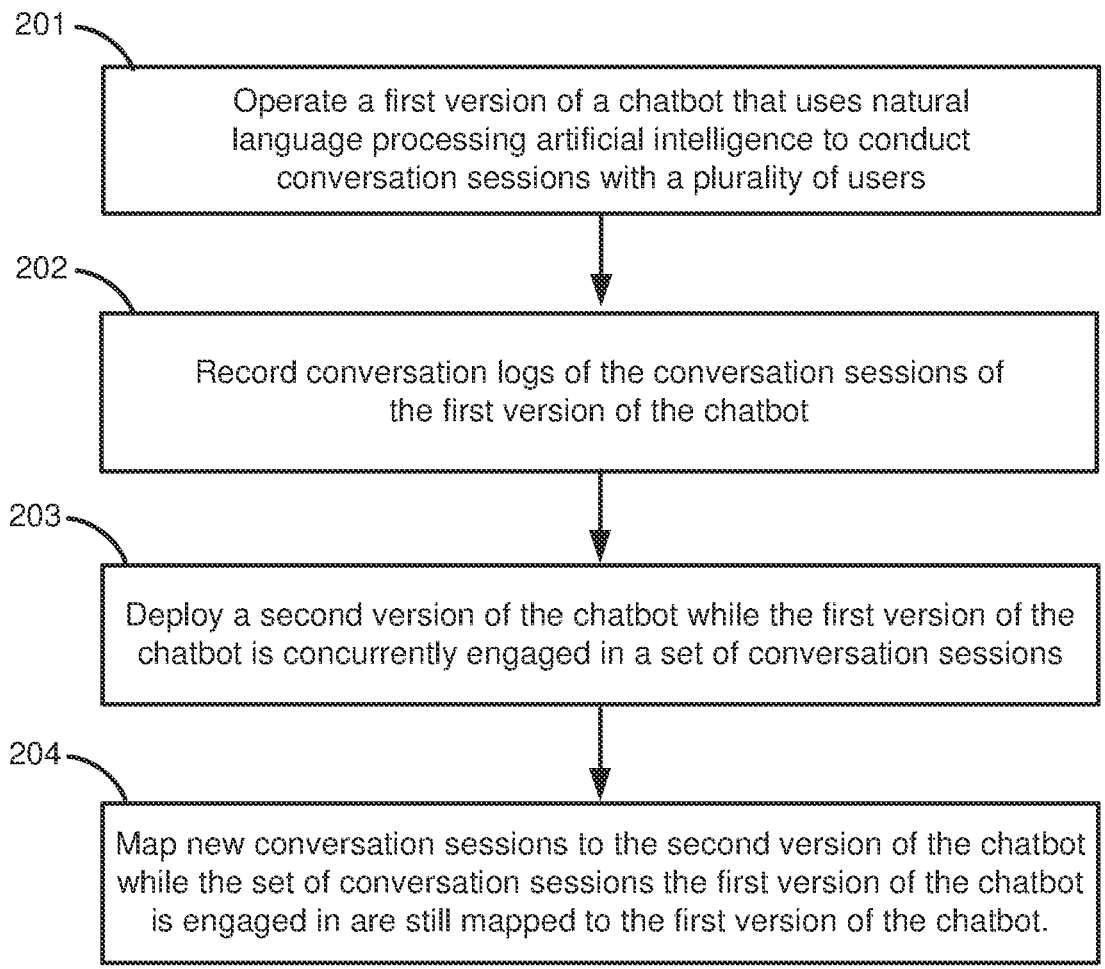
FIG. 2 shows a diagram of a method for realtime chatbot deployment, according to an embodiment.

FIG. 2 shows a diagram 200 of a computer-implemented method for realtime chatbot deployment, according to an embodiment. The method may be implemented by a computer system, such as the chatbot platform 110 described above with respect to FIG. 1 or the computer system 510 described below with respect to FIG. 5.

At 201, operate a first version of a chatbot that uses natural language processing to conduct conversation sessions with a plurality of users. The chatbot may be configured to provide conversation responses to its users by triggering a particular skill from among a plurality of skills. For example, a procurement chatbot may have a set of skills that includes a skill to create a purchase order, a skill to search for purchase orders, a skill to list purchase orders for a particular user, and other skills. The particular skill may correspond to an intent of the user. The plurality of skills may include a fallback skill that is triggered when no other skill of the plurality of skills corresponds to the intent of the user. For example, a fallback skill for a procurement bot could create a procurement helpdesk ticket, or connect the user with a human, when the procurement chatbot does not understand the intent of the user or does not have a skill to complete the request made by the user.

At 202, record conversation logs of the conversation sessions of the first version of the chatbot. The conversation logs may include a set of one or more conversations that triggered the fallback skill. The conversation log for each conversation may include a conversation identifier, a language identifier, a timezone identifier, a skill identifier of the skill that was triggered, client information such as a channel type used by the user (e.g., the user was using a web-based client), and a timestamp, for example.

At 203, deploy a second version of the chatbot while the first version of the chatbot is concurrently engaged in a set of conversation sessions. The set of conversation sessions for the first version of the chatbot may be mapped to the first version of the chatbot. The mapping may route utterances for those conversations to that chatbot. The second version of the chatbot may be configured to provide conversation responses to its users using a second plurality of skills including the fallback skill. The second version of the chatbot may also be configured to trigger other skills of the second plurality of skills besides the fallback skill for at least a portion of the one or more conversations in which the first version of the chatbot triggered the fallback skill. That is, the second version of the chatbot rectifies skill failures of the first chatbot (e.g., situations where the first chatbot triggered the fallback skill).

At 204, map new conversation sessions to the second version of the chatbot while the set of conversation sessions the first version of the chatbot is engaged in are still mapped to the first version of the chatbot. The mapping of conversations may route conversation statements or utterances made by the users to a particular chatbot. The new conversation sessions may occur after the set of conversation sessions the first version of the chatbot is engaged in. The set of conversation sessions the first version of the chatbot is engaged in may still be mapped to the first version of the chatbot.

In some embodiments the second version of the chatbot may be marked as "active" and the new conversations may be mapped to the second version because it is marked as active.

In some embodiments, the method may also include providing an application programming interface for accessing recorded conversation logs.

In some embodiments, the method may also include receiving an application programming interface request including an identifier of a chatbot owner. In some embodiments, the method may also include filtering the recorded conversation logs to obtain a set of conversations triggered the fallback skill with chatbots owned by the chatbot owner. In some embodiments, the method may also include sending an application programming interface response including the set of conversations. An example API request and API response are given above.

In some embodiments, the method may also include providing a user interface for accessing and displaying recorded conversation logs. The user interface may provide a button or other user interface element to filter the recorded conversation logs and display a set of conversations that triggered the fallback skill. For example, the user interface may include an "Identify Fallback skills triggered" button that, when selected, present a user with a list of conversations for which the fallback skill was triggered. This button may be included in a "conversation metrics" portion of a "monitor" tab within the user interface, for example.

In some embodiments, the method may also include marking the first version of the chatbot as inactive when there are no active conversation with the first version of the chatbot. In some embodiments, active conversations continue with a same version of the chatbot upon receiving a dialog utterance. Accordingly, the first version of the chatbot may be undeployed after no more conversations are using it, thereby avoiding disruption of existing conversations when the new version of the chatbot is deployed.

Figure 3:
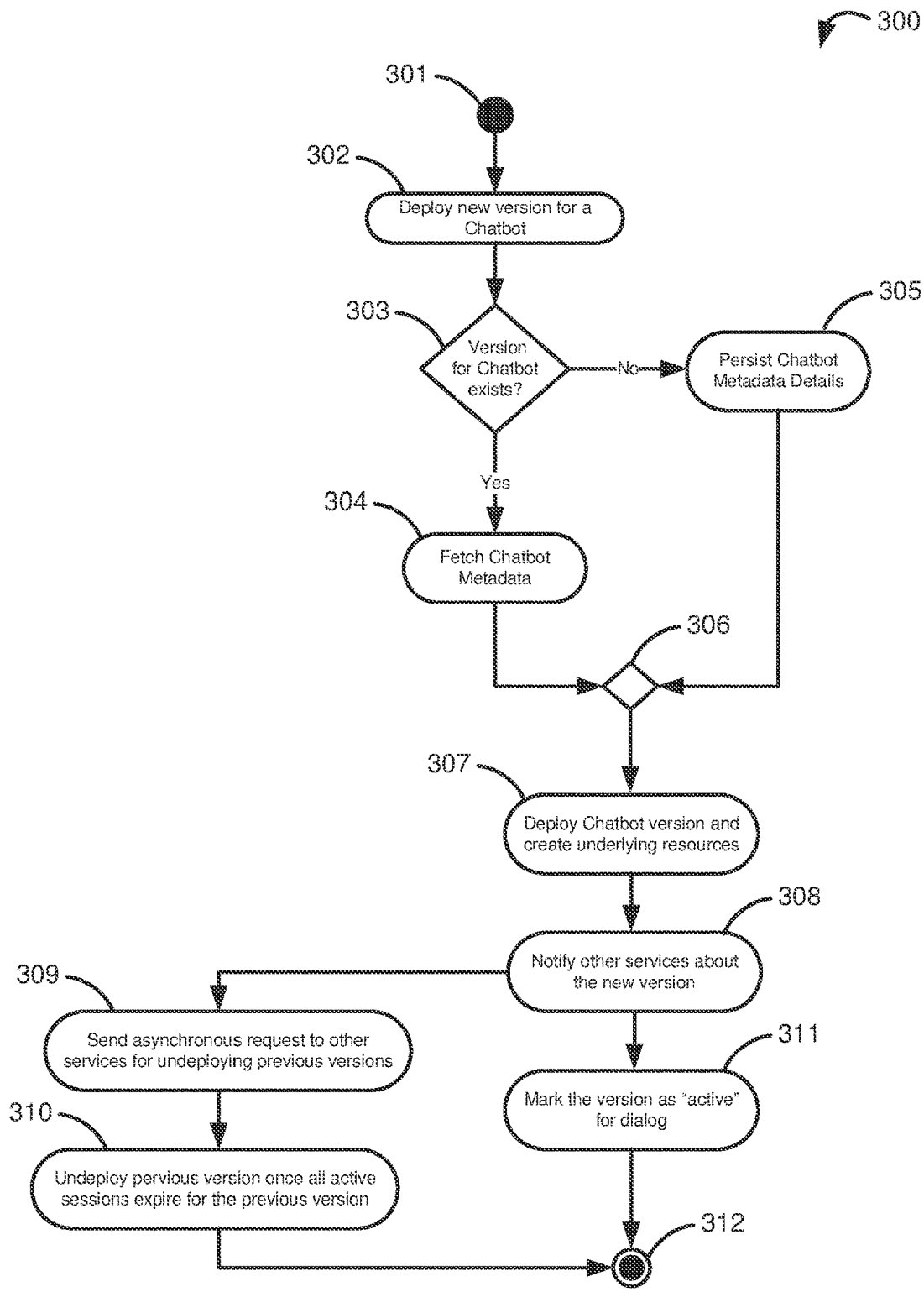
FIG. 3 shows a flowchart of a method for deploying a new version of a chatbot and undeploying an older version, according to an embodiment.

FIG. 3 shows a flowchart 300 of a method for deploying a new version of a chatbot and undeploying an older version, according to an embodiment. This technique for deploying a new version of a chatbot and undeploying an older version shown in the flowchart 300 may be implemented by a computer system, such as the chatbot platform 110 described above with respect to FIG. 1 or the computer system 510 described below with respect to FIG. 5.

The method starts at 301 and then continues to 302.

At 302, the method may deploy a new version for a chatbot. An example of deploying a new version of a chatbot was described above with respect to the chatbot version A 131 and chatbot version B 132 of FIG. 1.

At 303, the method may determine whether a version for the chatbot exists. The new version may be an updated version of an existing chatbot or it may be an initial version of a new chatbot.

If "yes," a version for the chatbot does exist, then the method may continue to 304 and fetch chatbot metadata. The metadata may include a description of the chatbot as well as configuration information including definitions and information on skills and intents used by the chatbot.

If "no," a version for the chatbot does not exist, the method may continue to 305 and persist chatbot metadata. This metadata may include the information mentioned for with respect to 304.

Whether "yes" or "no," the path of the flowchart joins at 306 and continues to 307.

At 307 the method may deploy the chatbot version and create underlying resources. The underlying resources may include computing and networking resources used to implement the chatbot. This may include creating a service to operate the chatbot, deploying the service into a computing cluster, etc.

After, at 308, the method may notify other services about the new version. The other services may be microservices used to implement the chatbot such as services for designing chatbots, services for handling dialog between the user at the chatbot, etc.

After 308, the method continues with both 309 and 311.

At 309, the method may send asynchronous requests to other services for undeploying previous versions of the chatbot. With the new version being deployed, the previous version is prepared to be "undeployed" by marking the previous version as "inactive" such that existing active conversations are completed using the previous version of the chatbot while new conversations. After 309 the method continues with 310.

At 310 the method may undeploy the previous version once all active sessions expire for the previous version. For example, any underlying resources or services allocated in deployment of the previous version of the chatbot may be deallocated from that previous version of the chatbot.

After the method notifies other services about the new version at 308, it also continues to 311. At 311 the method may mark the new version as "active" for dialog. After 310 or after 311, the flowchart ends at 312.

Thus, using the flowchart 300, a new chatbot may be deployed and services may be notified of the new version such that the previous version may be marked as inactive and prepared to be undeployed once all active sessions using the previous version expire (e.g., timeout or disconnect).

Figure 4:
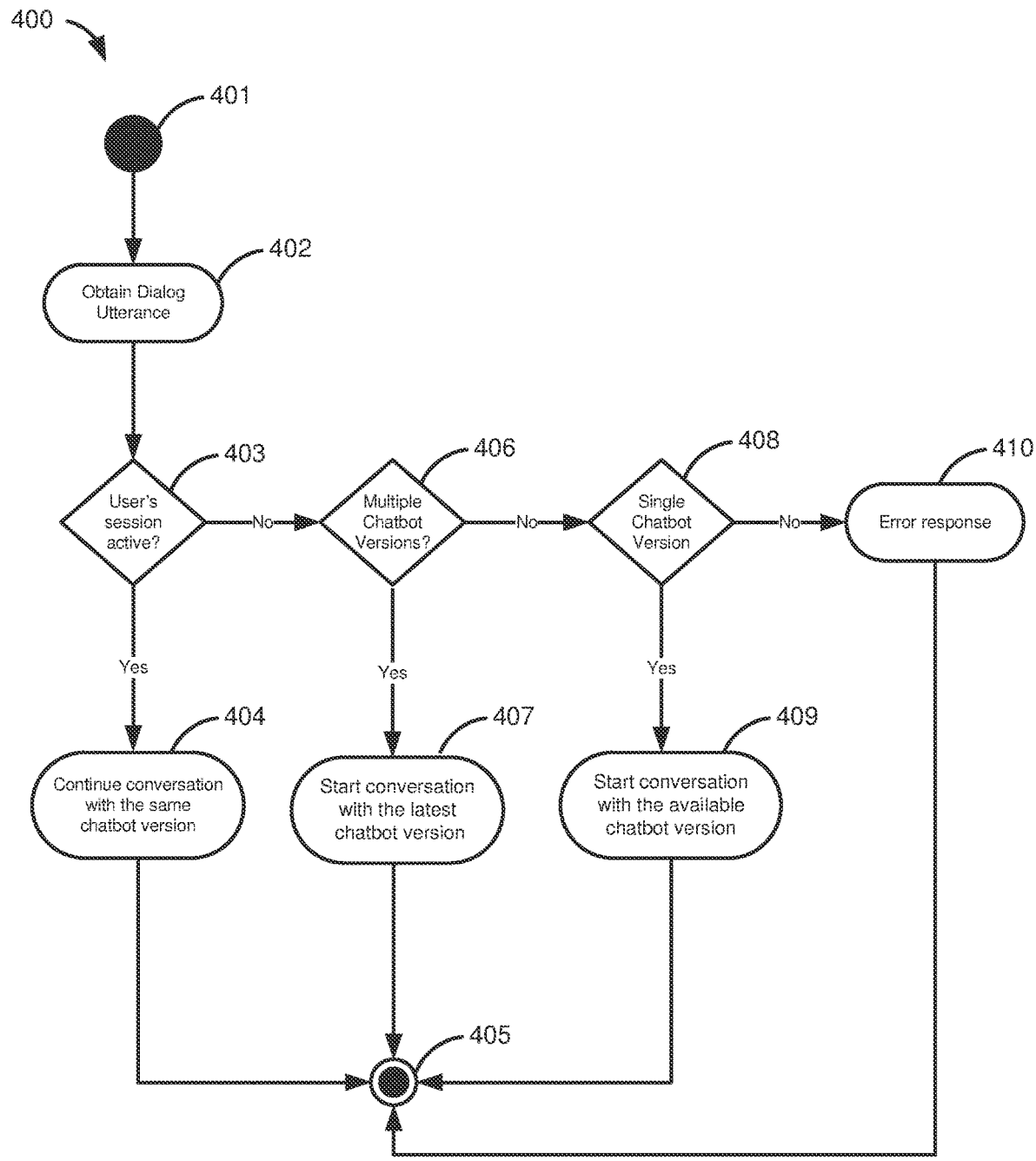
FIG. 4 shows a flowchart of a method for handling dialog utterances during realtime deployment of a new version of a chatbot, according to an embodiment.

FIG. 4 shows a flowchart 400 of a method for handling dialog utterances during realtime deployment of a new version of a chatbot, according to an embodiment. The technique for handling dialog utterances during realtime deployment of a new version of a chatbot shown in the flowchart 400 may be implemented by a computer system, such as the chatbot platform 110 described above with respect to FIG. 1 or the computer system 510 described below with respect to FIG. 5.

The flowchart 400 starts at 401.

At 402 the method may obtain a dialog utterance. This utterance may be one or more words or sentences input by a user to a chatbot. The dialog utterance may be received during realtime deployment of the new version of the chatbot.

After obtaining the utterance at 402, the method determines whether the user's session is "active," as opposed to "inactive," at 403. Whether the user's conversation session is active or not may be determined based on a flag, or based on a timeout interval, for example.

If "yes" at 403, the user's session is active at 403, the method may continue the conversation with the same chatbot version at 404. Then the flowchart ends at 405.

If "no" at 403, the user's session is not active (e.g., it is "inactive"), the method may continue to 406 and determine if there are multiple chatbot versions.

If "yes" at 406, there are multiple chatbot versions, the method may start the conversation with the latest chatbot version at 407. Then the flowchart ends at 405.

If "no" at 406, there are not multiple chatbot versions, the method continues to 408 and determines if there is a single chatbot version.

If "yes," at 408, there is a single chatbot version, then the method may start a conversation with the single available chatbot version at 409. Then the flowchart ends at 405.

If "no" at 408, there is no single chatbot version, then the method may give an error response at 410. Then the flowchart ends at 405.

Thus, using the flowchart 400, it may be determined which version of the chatbot should handle the utterance if there are multiple versions of the chatbot, which may occur during realtime deployment of a new version of the chatbot.

Example Hardware

Figure 5:
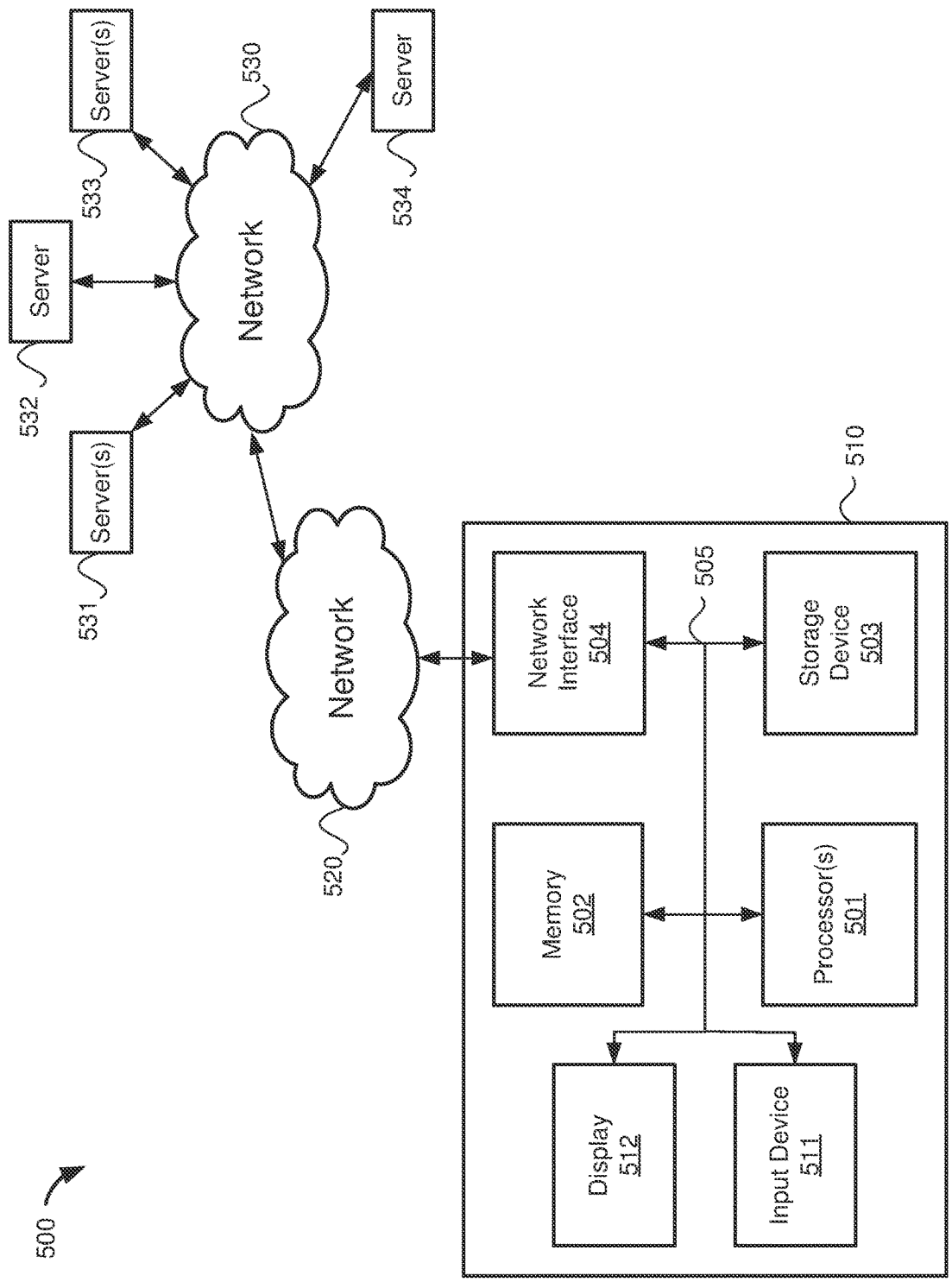
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531, 532, 533, 534. The servers 531-534 may be part of a cloud computing environment in some embodiments.

Additional Embodiments

Some embodiments provide a computer system comprising one or more processors and one or more machine-readable medium coupled to the one or more processors. The machine-readable medium storing computer program code comprising sets of instructions executable by the one or more processors. The sets of instructions executable to operate a first version of a chatbot. The chatbot uses natural language processing to conduct conversation sessions with a plurality of users. The chatbot is configured to provide conversation responses to its users by triggering a particular skill from among a plurality of skills where the particular skill corresponds to an intent of the user. The plurality of skills include a fallback skill that is triggered when no other skill of the plurality of skills corresponds to the intent of the user.

The sets of instructions are further executable to record conversation logs of the conversation sessions of the first version of the chatbot. The conversation logs include a set of one or more conversations that triggered the fallback skill.

The sets of instructions are further executable to deploy a second version of the chatbot while the first version of the chatbot is concurrently engaged in a set of conversation sessions. The set of conversation sessions are mapped to the first version of the chatbot. The second version of the chatbot is configured to provide conversation responses to its users using a second plurality of skills including the fallback skill. The second version of the chatbot is also configured to trigger other skills of the second plurality of skills besides the fallback skill for at least a portion of the one or more conversations in which the first version of the chatbot triggered the fallback skill.

The sets of instructions are further executable to map new conversation sessions to the second version of the chatbot where the new conversation sessions occur after the set of conversation sessions the first version of the chatbot is engaged in. The set of conversation sessions the first version of the chatbot is engaged in are still mapped to the first version of the chatbot.

In some embodiments of the computer system the sets of instructions are further executable to provide an application programming interface for accessing recorded conversation logs.

In some embodiments of the computer system the sets of instructions are further executable to receive an application programming interface request including an identifier of a chatbot owner, filter the recorded conversation logs to obtain a set of conversations triggered the fallback skill with chatbots owned by the chatbot owner, and send an application programming interface response including the set of conversations.

In some embodiments of the computer system the sets of instructions are further executable to provide a user interface for accessing and displaying recorded conversation logs. The user interface provides a button or other user interface element to filter the recorded conversation logs and display a set of conversations that triggered the fallback skill.

In some embodiments of the computer system the sets of instructions are further executable to mark the first version of the chatbot as inactive when there are no active conversation with the first version of the chatbot.

In some embodiments of the computer system active conversations continue with a same version of the chatbot upon receiving a dialog utterance.

In some embodiments of the computer system inactive conversations continue with a latest version of the chatbot upon receiving a dialog utterance. For example, the second version of the chatbot is the "latest version" if that was the most recent version of the chatbot to have been deployed.

Some embodiments provide a non-transitory computer-readable medium storing computer program code. The computer program code comprises sets of instructions to operate a first version of a chatbot. The chatbot uses natural language processing to conduct conversation sessions with a plurality of users. The chatbot is configured to provide conversation responses to its users by triggering a particular skill from among a plurality of skills. The particular skill corresponds to an intent of the user. The plurality of skills include a fallback skill that is triggered when no other skill of the plurality of skills corresponds to the intent of the user.

The computer program code further comprises sets of instructions to record conversation logs of the conversation sessions of the first version of the chatbot. The conversation logs include a set of one or more conversations that triggered the fallback skill.

The computer program code further comprises sets of instructions to deploy a second version of the chatbot while the first version of the chatbot is concurrently engaged in a set of conversation sessions. The set of conversation sessions being mapped to the first version of the chatbot. The second version of the chatbot is configured to provide conversation responses to its users using a second plurality of skills including the fallback skill. The second version of the chatbot configured to trigger other skills of the second plurality of skills besides the fallback skill for at least a portion of the one or more conversations in which the first version of the chatbot triggered the fallback skill.

The computer program code further comprises sets of instructions to map new conversation sessions to the second version of the chatbot. The new conversation sessions occur after the set of conversation sessions the first version of the chatbot is engaged in. The set of conversation sessions the first version of the chatbot is engaged in are still mapped to the first version of the chatbot.

In some embodiments of the non-transitory computer-readable medium, the computer program code further comprises sets of instructions to provide an application programming interface for accessing recorded conversation logs.

In some embodiments of the non-transitory computer-readable medium, the computer program code further comprises sets of instructions to receive an application programming interface request including an identifier of a chatbot owner, filter the recorded conversation logs to obtain a set of conversations triggered the fallback skill with chatbots owned by the chatbot owner, and send an application programming interface response including the set of conversations.

In some embodiments of the non-transitory computer-readable medium, the computer program code further comprises sets of instructions to provide a user interface for accessing and displaying recorded conversation logs, the user interface providing a button or other user interface element to filter the recorded conversation logs and display a set of conversations that triggered the fallback skill.

In some embodiments of the non-transitory computer-readable medium, the computer program code further comprises sets of instructions to mark the first version of the chatbot as inactive when there are no active conversation with the first version of the chatbot.

In some embodiments of the non-transitory computer-readable medium, active conversations continue with a same version of the chatbot upon receiving a dialog utterance In some embodiments of the non-transitory computer-readable medium, the inactive conversations continue with a latest version of the chatbot upon receiving a dialog utterance.

Some embodiments provide a computer-implemented method. The method comprises operating a first version of a chatbot. The chatbot uses natural language processing to conduct conversation sessions with a plurality of users. The chatbot is configured to provide conversation responses to its users by triggering a particular skill from among a plurality of skills where the particular skill corresponds to an intent of the user. The plurality of skills include a fallback skill that is triggered when no other skill of the plurality of skills corresponds to the intent of the user.

The method further comprises recording conversation logs of the conversation sessions of the first version of the chatbot, the conversation logs including a set of one or more conversations that triggered the fallback skill;

The method further comprises deploying a second version of the chatbot while the first version of the chatbot is concurrently engaged in a set of conversation sessions. The set of conversation sessions being mapped to the first version of the chatbot. The second version of the chatbot is configured to provide conversation responses to its users using a second plurality of skills including the fallback skill. The second version of the chatbot is configured to trigger other skills of the second plurality of skills besides the fallback skill for at least a portion of the one or more conversations in which the first version of the chatbot triggered the fallback skill.

The method further comprises mapping new conversation sessions to the second version of the chatbot. The new conversation sessions occur after the set of conversation sessions the first version of the chatbot is engaged in. The set of conversation sessions the first version of the chatbot is engaged in are still mapped to the first version of the chatbot.

In some embodiments of the computer-implemented method, the method further comprises providing an application programming interface for accessing recorded conversation logs.

In some embodiments of the computer-implemented method, the method further comprises receiving an application programming interface request including an identifier of a chatbot owner, filtering the recorded conversation logs to obtain a set of conversations triggered the fallback skill with chatbots owned by the chatbot owner, and sending an application programming interface response including the set of conversations.

In some embodiments of the computer-implemented method, the method further comprises providing a user interface for accessing and displaying recorded conversation logs, the user interface providing a button or other user interface element to filter the recorded conversation logs and display a set of conversations that triggered the fallback skill.

In some embodiments of the computer-implemented method, the method further comprises marking the first version of the chatbot as inactive when there are no active conversation with the first version of the chatbot.

In some embodiments of the computer-implemented method, active conversations continue with a same version of the chatbot upon receiving a dialog utterance, and wherein inactive conversations continue with a latest version of the chatbot upon receiving a dialog utterance.

What is claimed is:

1. A computer system, comprising:
   one or more processors;
   one or more machine-readable medium coupled to the one or more processors and storing computer program code comprising sets of instructions executable by the one or more processors to:
   operate, by a first computer system, a first version of a chatbot, the chatbot using natural language processing to conduct conversation sessions with a plurality of users, wherein the chatbot is configured to provide conversation responses to the plurality of users by triggering a particular skill from among a first plurality of skills, wherein the particular skill corresponds to an intent of a user, wherein the first plurality of skills includes a fallback skill that is triggered when no other skill of the first plurality of skills corresponds to the intent of the user;
   record, by the first computer system, conversation logs of the conversation sessions of the first version of the chatbot, the conversation logs including a set of one or more conversations that triggered the fallback skill, each conversation log comprising a unique identifica-
   tion, a skill description of the particular skill triggered by a particular conversation, and a skill identification;
   access, by a first user on a second computer system, the conversation logs through an API, the second computer system sending a payload to the first computer system comprising a unique identifier for the first user and a first date and second date, the first computer system sending to the second computer system a response payload comprising a plurality of conversation logs;
   filter, by the first user on the second computer system, the conversation logs to obtain conversation logs comprising the fallback skill;
   deploy, by the first user, a second version of the chatbot from the second computer system to the first computer system while the first version of the chatbot is concurrently engaged in a set of conversation sessions on the first computer system without affecting ongoing conversations with the first version of the chatbot,
   wherein the second version of the chatbot comprises a second plurality of skills including the first plurality of skills, one or more new skills, and the fallback skill,
   wherein the set of conversation sessions are mapped to the first version of the chatbot,
   wherein the second version of the chatbot is configured to provide conversation responses to a second plurality of users using a second plurality of skills including the fallback skill,
   wherein the second version of the chatbot is configured to trigger one or more new skills of the second plurality of skills instead of the fallback skill for at least a portion of the one or more conversations where the first version of the chatbot triggered the fallback skill; and
   map, by the first computer system, new conversation sessions to the second version of the chatbot, the new conversation sessions occurring after the set of conversation sessions the first version of the chatbot is engaged in, wherein the set of conversation sessions the first version of the chatbot is engaged in are still mapped to the first version of the chatbot;
   determining, by the first computer system, when there are no active conversations with the first version of the chatbot; and
   marking, by the first computer system, the first version of the chatbot as inactive based on said determining.

2. The computer system of claim 1, wherein the computer program code further comprises sets of instructions executable by the one or more processors to:
   provide a user interface for accessing and displaying recorded conversation logs, the user interface providing a button or other user interface element to filter the recorded conversation logs and display a set of conversations that triggered the fallback skill.

3. The computer system of claim 1, wherein active conversations continue with a same version of the chatbot upon receiving a dialog utterance.

4. The computer system of claim 1, wherein inactive conversations continue with a latest version of the chatbot upon receiving a dialog utterance.

5. A non-transitory computer-readable medium storing computer program code comprising sets of instructions to:
   operate, by a first computer system, a first version of a chatbot, the chatbot using natural language processing to conduct conversation sessions with a plurality of users, wherein the chatbot is configured to provide conversation responses to the plurality of users by triggering a particular skill from among a first plurality of skills, wherein the particular skill corresponds to an intent of a user, wherein the first plurality of skills includes a fallback skill that is triggered when no other skill of the first plurality of skills corresponds to the intent of the user;

record, by the first computer system, conversation logs of the conversation sessions of the first version of the chatbot, the conversation logs including a set of one or more conversations that triggered the fallback skill, each conversation log comprising a unique identification, a skill description of the particular skill triggered by a particular conversation, and a skill identification;

access, by a first user on a second computer system, the conversation logs through API, the second computer system sending a payload to the first computer system comprising a unique identifier for the first user and a first date and second date, the first computer system sending to the second computer system a response payload comprising a plurality of conversation logs;

filter, by the first user on the second computer system, the conversation logs to obtain conversation logs comprising the fallback skill;

deploy, by the first user, a second version of the chatbot from the second computer system to the first computer system while the first version of the chatbot is concurrently engaged in a set of conversation sessions on the first computer system without affecting ongoing conversations with the first version of the chatbot,
wherein the second version of the chatbot comprises a second plurality of skills including the first plurality of skills, one or more new skills, and the fallback skill,
wherein the set of conversation sessions are mapped to the first version of the chatbot,
wherein the second version of the chatbot is configured to provide conversation responses to a second plurality of users using a second plurality of skills including the fallback skill,
wherein the second version of the chatbot is configured to trigger one or more new skills of the second plurality of skills instead of the fallback skill for at least a portion of the one or more conversations where the first version of the chatbot triggered the fallback skill; and map, by the first computer system, new conversation sessions to the second version of the chatbot, the new conversation sessions occurring after the set of conversation sessions the first version of the chatbot is engaged in, wherein the set of conversation sessions the first version of the chatbot is engaged in are still mapped to the first version of the chatbot;

determining, by the first computer system, when there are no active conversations with the first version of the chatbot; and marking, by the first computer system, the first version of the chatbot as inactive based on said determining.

6. The non-transitory computer-readable medium of claim 5, wherein the computer program code further comprises sets of instructions to:
provide a user interface for accessing and displaying recorded conversation logs, the user interface providing a button or other user interface element to filter the recorded conversation logs and display a set of conversations that triggered the fallback skill.

7. The non-transitory computer-readable medium of claim 5, wherein active conversations continue with a same version of the chatbot upon receiving a dialog utterance.

8. The non-transitory computer-readable medium of claim 5, wherein inactive conversations continue with a latest version of the chatbot upon receiving a dialog utterance.

9. A computer-implemented method, comprising:
operating, by a first computer system, a first version of a chatbot, the chatbot using natural language processing to conduct conversation sessions with a plurality of users, wherein the chatbot is configured to provide conversation responses to the plurality of users by triggering a particular skill from among a first plurality of skills, wherein the particular skill corresponds to an intent of a user, wherein the first plurality of skills includes a fallback skill that is triggered when no other skill of the first plurality of skills corresponds to the intent of the user;

recording, by the first computer system, conversation logs of the conversation sessions of the first version of the chatbot, the conversation logs including a set of one or more conversations that triggered the fallback skill, each conversation log comprising a unique identification, a skill description of the particular skill triggered by a particular conversation, and a skill identification;

accessing, by a first user on a second computer system, the conversation logs through API, the second computer system sending a payload to the first computer system comprising a unique identifier for the first user and a first date and second date, the first computer system sending to the second computer system a response payload comprising a plurality of conversation logs;

filtering, by the first user on the second computer system, the conversation logs to obtain conversation logs comprising the fallback skill;

deploying, by the first user, a second version of the chatbot from the second computer system to the first computer system while the first version of the chatbot is concurrently engaged in a set of conversation sessions on the first computer system without affecting ongoing conversations with the first version of the chatbot,
wherein the second version of the chatbot comprises a second plurality of skills including the first plurality of skills, one or more new skills, and the fallback skill,
wherein the set of conversation sessions are mapped to the first version of the chatbot,
wherein the second version of the chatbot is configured to provide conversation responses to a second plurality of users using a second plurality of skills including the fallback skill,
wherein the second version of the chatbot is configured to trigger one or more new skills of the second plurality of skills instead of the fallback skill for at least a portion of the one or more conversations where the first version of the chatbot triggered the fallback skill; and mapping, by the first computer system, new conversation sessions to the second version of the chatbot, the new conversation sessions occurring after the set of conversation sessions the first version of the chatbot is engaged in, wherein the set of conversation sessions the first version of the chatbot is engaged in are still mapped to the first version of the chatbot;

determining, by the first computer system, when there are no active conversations with the first version of the chatbot; and marking, by the first computer system, the first version of the chatbot as inactive based on said determining.

10. The computer-implemented method of claim 9, further comprising:

providing a user interface for accessing and displaying recorded conversation logs, the user interface providing a button or other user interface element to filter the recorded conversation logs and display a set of conversations that triggered the fallback skill.

11. The computer-implemented method of claim 9, wherein active conversations continue with a same version of the chatbot upon receiving a dialog utterance, and wherein inactive conversations continue with a latest version of the chatbot upon receiving a dialog utterance.

* * * * *